(12) United States Patent
Kathol

(10) Patent No.: US 7,213,055 B1
(45) Date of Patent: May 1, 2007

(54) METHOD AND APPARATUS FOR DISTRIBUTION OF ENTERTAINMENT AND DATA TO PASSENGER USING CABLE MODEMS

(75) Inventor: Shawn Kathol, Diamond Bar, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 858 days.

(21) Appl. No.: 10/047,708

(22) Filed: Jan. 15, 2002

(51) Int. Cl.
*G06F 15/16* (2006.01)
*H04N 7/18* (2006.01)
(52) U.S. Cl. ........................................ 709/217; 725/76
(58) Field of Classification Search ................. 725/76; 348/8; 709/206, 217
See application file for complete search history.

(56) References Cited

U.S. PATENT DOCUMENTS

| 4,352,200 | A | * | 9/1982 | Oxman | 455/41.2 |
| 5,973,722 | A | * | 10/1999 | Wakai et al. | 725/76 |
| 6,249,913 | B1 | * | 6/2001 | Galipeau et al. | 725/76 |
| 6,757,712 | B1 | * | 6/2004 | Bastian et al. | 709/206 |
| 6,810,527 | B1 | * | 10/2004 | Conrad et al. | 725/76 |
| 6,813,777 | B1 | * | 11/2004 | Weinberger et al. | 725/76 |
| 2005/0273823 | A1 | * | 12/2005 | Brady et al. | 725/76 |
| 2006/0271967 | A1 | * | 11/2006 | So | 725/76 |
| 2007/0011705 | A1 | * | 1/2007 | Tsuria et al. | 725/46 |

* cited by examiner

*Primary Examiner*—William Vaughn
*Assistant Examiner*—J. Bret Dennison
(74) *Attorney, Agent, or Firm*—Nathan O. Jensen; Kyle Eppele

(57) ABSTRACT

Cable modem terminator comprising new head-end of passenger in-flight entertainment system forms an extended intranet through cable modems disposed at one or more passengers seats. Cable modems form secondary digital networks that deliver data and entertainment content to aircraft integral devices or personal electronic devices belonging to individual passengers.

8 Claims, 6 Drawing Sheets

METHOD AND APPARATUS FOR DISTRIBUTION OF ENTERTAINMENT AND DATA TO PASSENGER USING CABLE MODEMS

BACKGROUND OF THE INVENTION

1. Technical Field

This invention pertains to the field of in-flight entertainment. Specifically, this invention pertains to methods and apparatus for communicating digital information between a system head-end, passenger interface electronics and personal electronic devices.

2. Description of the Prior Art

The term "in-flight entertainment system" typically refers to a collection of electronic equipment that collectively provide the facilities necessary to disseminate entertainment content or digital information to airline passengers. The in-flight entertainment, or "IFE" system deployed in a typical aircraft usually comprises some collection of equipment referred to as a "head-end".

The head-end equipment may comprise an entertainment content server. In many cases, the entertainment content server may be a simple video-cassette-player (VCP). In other embodiments of an IFE system, the entertainment content server may be a sophisticated video-server that is configured to provide streaming video. Such content will normally be encoded into a digital form and stored on computer readable media comprising the video server. In either embodiment, the output emanating from the entertainment content server may be modulated onto a radio-frequency (RF) carrier. The RF carrier may then be disseminated throughout an aircraft using an RF distribution subsystem.

An RF distribution subsystem may comprise a wire-based cable plant capable of carrying RF energy and distributing the RF energy throughout the aircraft. Such cable types typically include coaxial cable that is capable of propagating RF signals without introducing significant degradation or excessive power loss. In some embodiments, the RF distribution system may comprise a hybrid configuration where RF signals are distributed through the aircraft using a combination of wire-based and fiber optic medium. In these embodiments, conversion units convert the RF signals from RF energy to modulated light as the medium changes. In yet other embodiments, the RF distribution system may be wireless altogether.

In most IFE systems, the physical cable comprises only a portion of the RF distribution subsystem. The RF distribution subsystem may further comprise components that are linked together by the physical cable. In one system, area distribution boxes, or "ADB"s, are used as part of a main trunk for the RF distribution subsystem. In one embodiment of a known IFE system, a first ADB receives an RF signal from a modulator that comprises the head-end equipment. After the first ADB receives the RF signal, it may propagate the RF signal through a segment of cable to another ADB. The second ADB may then propagate the RF signal to subsequent ADBs forming a distribution string.

Completing the RF distribution subsystem, each ADB may further comprise branching interfaces that propagate the RF signal to one or more seat boxes. Each of the seat boxes may serve one or more seats. Each seat box typically receives an RF signal from an ADB. The seat box may demodulate the RF signal in order to extract entertainment and/or data content carried by a modulated carrier. Each seat box may subsequently present the recovered entertainment or data content to a passenger seated in an airline seat. Seat boxes may also be chained sequentially to form branches off of the main distribution string formed by the ADBs.

IFE systems have recently been upgraded with the capability to provide on-demand video content and information content to airline passengers. To facilitate this type of on-demand service, the IFE systems typically comprise a control computer within the head-end electronics suite. A passenger local-area-network (LAN) may be deployed in parallel with the RF distribution subsystem. Many IFE systems closely associate the passenger LAN and the RF distribution system. In some embodiments, this is accomplished by using the ADBs that are primarily responsible for RF distribution, as network hubs.

In operation, the passenger LAN is used to communicate individual passenger requests for data or video content back to a control computer. The control computer may route these requests to either an entertainment content server or a data server installed in the head-end. Individual passengers may also use the passenger LAN quite directly. Typically, any passenger may connect a personal electronic device to a seat box. The seat box serves as an interface to the passenger LAN. Hence, the passenger LAN forms a classic intranet structure on board the aircraft and enables direct access to the on-board data server.

Each new IFE installation is usually tailored to a specific type of aircraft. For instance, the IFE system configuration for a Boeing 747 may differ significantly from the configuration used onboard an Airbus A330. Such differences are inevitable because of the inherent differences in each aircraft body type. Irrespective of the configuration any particular IFE system must adopt, several key design objectives remain constant.

One significant design objective is that of reducing the amount of weight the total IFE system contributes to the aircraft's take-off weight. The reason for this is that each pound of weight increases the overall fuel consumption for any passenger flight. Of course, this cost must either be passed on to the flying public or the airline operator must absorb it.

A significant weight reduction could be achieved if the passenger LAN could be combined with the RF distribution system. The reason for this is simple-wire is heavy. In known IFE systems, the passenger LAN requires installation of a separate physical medium. It would be highly advantageous if the passenger LAN's network data could be carried along the same physical medium as the entertainment content, i.e. the RF distribution subsystem.

SUMMARY OF THE INVENTION

The present invention comprises a method for delivering entertainment and other data to passengers onboard an aircraft using a radio frequency (RF) distribution subsystem. According to one example of embodiment of the present invention, the method provides for the attachment of an airborne server to a first digital network. The data and/or entertainment content may be stored on the server and subsequently directed to a first digital network.

In this example of embodiment, the method provides that the first digital network be converted to a radio frequency distribution medium. Accordingly, the RF energy may be distributed throughout the aircraft. The radio frequency distribution medium may then be converted to one or more secondary digital networks. In some embodiments of this method, aircraft integral devices, which may comprise seat electronics units and display units, may be attached to these secondary digital networks.

The present invention may further comprise an additional step of allowing passengers to connect personal electronic devices to these secondary digital networks. In those embodiments of this inventive method, the present invention may further comprise yet another additional step for receiving network requests from these personnel electronic devices and selectively redirecting these network requests to an airborne server.

According to one illustrative method commensurate with the invention, the step of selectively redirecting network requests may comprise a first step of examining the destination address in any given network request. Where the network request is generated by a user who has registered for off-aircraft services, the destination address of the network requests is not altered. In those situations where a user has not registered for off-aircraft services, the destination address for network requests generated by that user are translated to match the address of an onboard data server. It should be noted, that in those situations where users have registered for off-aircraft services, the network requests may typically be routed to a communications unit. The communications unit may propagate the network requests from the aircraft to other network resources such as the Internet.

Because entertainment content in an IFE system is typically disseminated to aircraft integral display apparatus as an RF signal, personal electronic devices may not be capable of receiving entertainment content normally stored in an entertainment content server. Hence, in one illustrative method of the present invention, entertainment content may be stored in an airborne server. Entertainment content from the airborne server may then be directed to the first digital network. The entertainment content stored on the airborne server may typically comprise digital data representative of the entertainment content. Once this digital data is propagated to the secondary digital networks, personal electronic devices and even aircraft integral devices may receive the digital representation of the entertainment content stored on the airborne server.

In some embodiments of this method, conversion of the first digital network to a radio frequency distribution medium may comprise conversion into a Data Over Cable Service Interface Specification (DOCSIS) compliant modulated signal. In these embodiments, the radio frequency distribution medium typically carries the DOCSIS compliant signal throughout the aircraft. The DOCSIS compliant signal may then be converted into one or more secondary digital networks. In all of these example embodiments, either the first or the second digital network may be an Ethernet.

The present invention further comprises a passenger in-flight entertainment system that employs the method described thus far. In one example embodiment of an in-flight entertainment system according to the present invention, the system may comprise an airborne server, a first digital network, a cable modem terminator, a cable modem, and a secondary digital network. In some embodiments of the present invention, the cable modem terminator and the cable modem may be DOCSIS compliant devices.

According to this illustrative embodiment, the airborne server is capable of sourcing data and may be attached to the first digital network. The cable modem terminator may also be attached to the first digital network and may receive data from the airborne server by virtue of a common connection to the first digital network. The cable modem terminator typically generates a carrier signal that is modulated according to the data that it receives from the server by way of the first digital network.

This embodiment of the present invention may further comprise a radio frequency distribution subsystem. In operation, the carrier signal generated by the cable modem terminator may be propagated throughout the aircraft using the radio frequency distribution subsystem. The cable modem may then be attached to the radio frequency distribution subsystem and may extract digital data from the data-modulated carrier signal. This extracted digital data may then be conveyed to a secondary digital network. In most embodiments of this invention, the in-flight entertainment system utilizes Ethernet as the first digital network, the second digital network, or both.

Some in-flight entertainment systems constructed according to the teachings of the present invention may further comprise an attachment interface. This attachment interface provides a portal for passengers to connect personal electronic devices to the secondary digital network. This allows personal electronic devices, which may belong to individual passengers, to access data and/or entertainment stored on the airborne server.

This type of access may typically be accomplished by conveying a network request to the secondary digital network. The cable modem may receive the network request from the secondary digital network and may generate a request-carrying carrier signal that is modulated according to the network request. The request-carrying carrier may then be propagated back to the cable modem terminator via the radio frequency distribution subsystem. Once the cable modem terminator receives the request-carrying carrier signal, it may demodulate the signal in order to extract the network request and convey that network request to the airborne server using the first digital network.

Some IFE systems according to the present invention may further comprise a network address translation unit. In one such illustrative embodiment, the network address translation unit conforms the address of passenger network requests making them compatible with the address scheme of the first digital network.

In yet another embodiment of the present invention, the network address translation unit further comprises a user registration unit. The user registration unit allows individual passengers on board the aircraft to register for off-aircraft data service. As network requests arrive at the network address translation unit, the user registration unit determines the source of each request.

Network requests generated by users who have registered for off-aircraft data service are typically routed to a communications unit. The communications unit may propagate the requests to other off-aircraft network resources. Network requests generated by users who have not registered for off-aircraft data service are typically directed to the airborne server.

Commensurate with the method of the present invention, an in-flight entertainment system may comprise an airborne data server that stores entertainment content. In those in-flight entertainment system configurations that need to support delivery of entertainment content to personal electronic devices, entertainment content stored on the airborne server may be directed to the first digital network and propagated through the RF medium by the cable modem terminator. A cable modem attached to the RF medium may then convey the entertainment content to the secondary digital network.

Personal electronic devices and/or aircraft integral devices may then receive the entertainment content from the secondary digital network.

The method and apparatus of the present invention effectively eliminate the need for a separate medium to carry digital information from a new head-end suite of electronics and passenger portals for the system. Hence, the present invention further comprises a new head-end. According to one illustrative embodiment of such a new head-end, an airborne server is provided for the purpose of sourcing data. This data may be entertainment content. The new head-end further comprises a first digital network that receives data from the airborne server. The new head-end further comprises a cable modem terminator that accepts data from the server by way of the first digital network and creates carrier signals that are modulated according to the data. In some embodiments of the present invention, the cable modem terminator may be a DOCSIS compliant device.

BRIEF DESCRIPTION OF THE DRAWINGS

The foregoing features, aspects, and advantages of the present invention will become better understood from the following detailed description of one embodiment of the invention with reference to the drawings, in which.

DETAILED DESCRIPTION OF THE INVENTION

Figure 1:
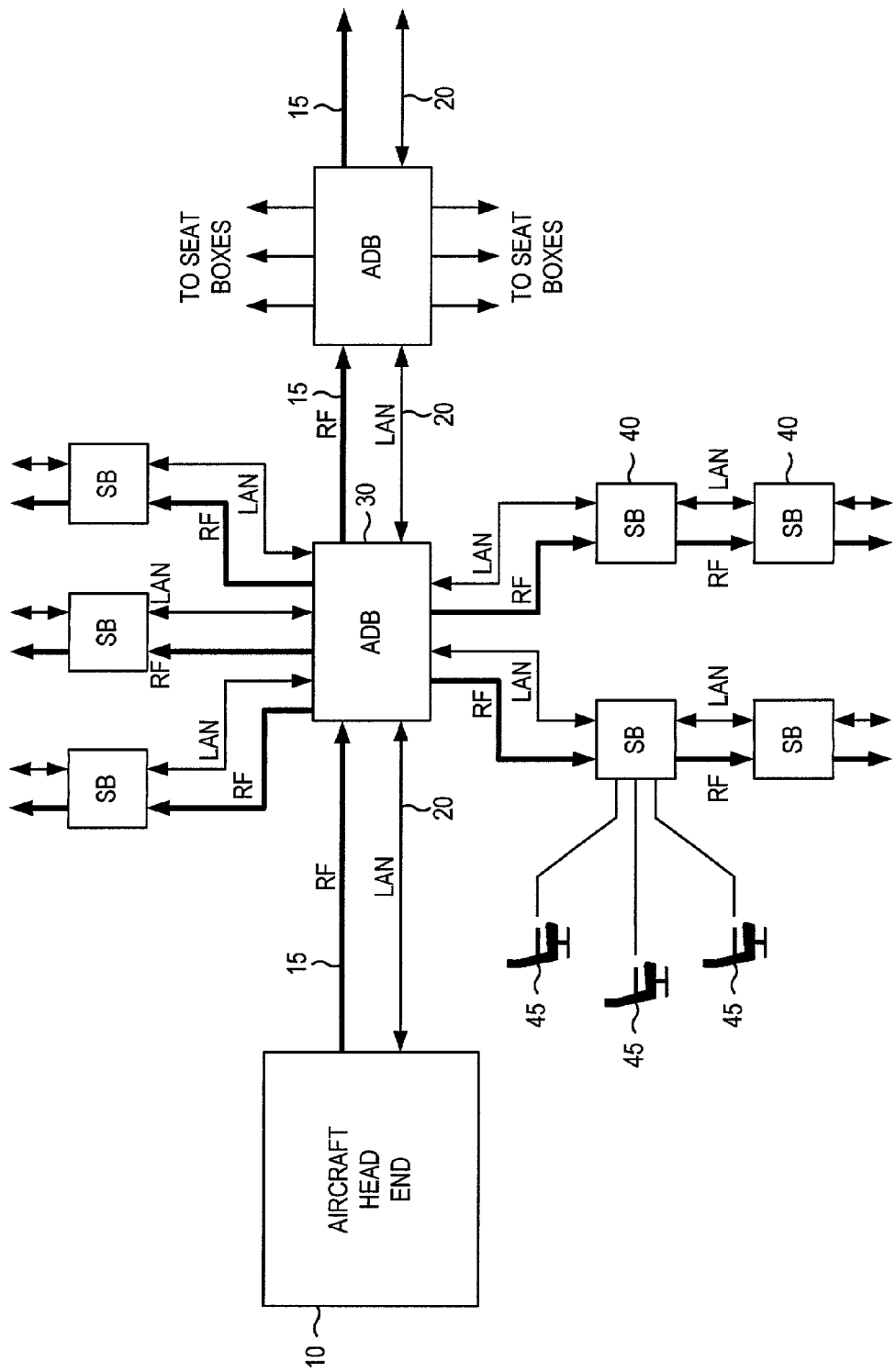
FIG. 1 is a block diagram that depicts a typical IFE system of prior art.

FIG. 1 is a block diagram that depicts a typical IFE system of prior art. In such systems, an aircraft is typically equipped with a head-end 10. The composition of the head-end may be varied according to aircraft type and entertainment and data services that must be provided in any particular system implementation.

The head-end 10 is usually required to disseminate entertainment content to a plurality of airline passengers 45 using an RF distribution subsystem 15. The RF distribution subsystem 15 may comprise cabling that carries RF signals from the head-end. The cabling may be augmented by other components that complete an RF distribution path. One such component is an area distribution box (ADB) 30. A typical IFE system of prior art may comprise one or more of these ADBs. In a typical embodiment, the IFE's head-end 10 may disseminate RF signals using RF cable that connects the head-end to a first ADB 30. The first ADB may then propagate the RF signal to additional ADBs in order to form a distribution string. Each ADB 30 siphons off a portion of the RF energy it receives and propagates the energy it taps off to one or more seat boxes 40. Each seat box 40 may then take an amount of RF energy to support demodulation of an RF carrier. Entertainment content recovered from the carrier may then be presented to airline passengers 45 enjoying the IFE system.

In known systems, a separate and distinct local-area-network (LAN) may also be deployed within the aircraft. This separate passenger LAN 20 carries, among other things, entertainment service and data requests generated by airline passengers 45. Even though the passenger LAN 20 is carried by a medium that is physically separate from the RF distribution subsystem, the LAN medium is typically propagated by the same electronic devices that complete the RF path, i.e. the ADBs and seat boxes.

Figure 2:
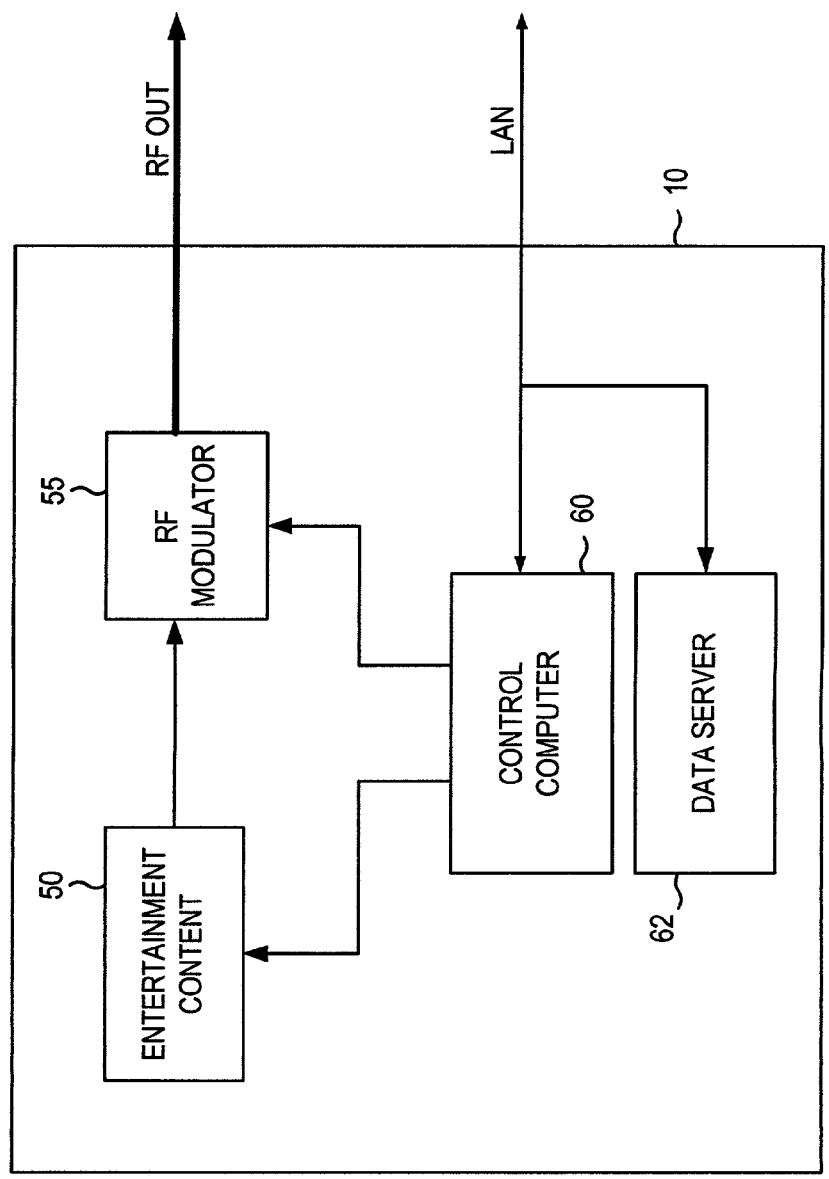
FIG. 2 is a block diagram that depicts one example embodiment of a head-end typical of prior art.

FIG. 2 is a block diagram that depicts one example embodiment of a head-end typical of prior art. In IFE systems, the head-end may comprise an entertainment content server 50. In most embodiments, the head-end also typically comprises an RF modulator 55. The RF modulator 55 typically accepts entertainment content from the entertainment content server 50. The entertainment content emanating from the entertainment content server 50 may be used to modulate an RF carrier. The modulated RF signal may then be distributed to various distribution points within the aircraft.

In a video-on-demand IFE system, the entertainment content server 50 may select appropriate entertainment content based on requests received from individual passengers 45. In these instances, the head-end 10 may further comprise a control computer 60. The control computer 60 receives individual content requests from the passengers 45 and directs the entertainment content server 50 to disseminate the appropriate content according to the request.

In some IFE configurations, the head-end may further comprise a data server 62. In those embodiments of an IFE system that comprise such a data server, airline passengers may be allowed to connect their own personal electronic devices to the passenger LAN 20 in order to access data stored on the data server 62. The passenger LAN may also carry these data-oriented transactions.

Figure 3:
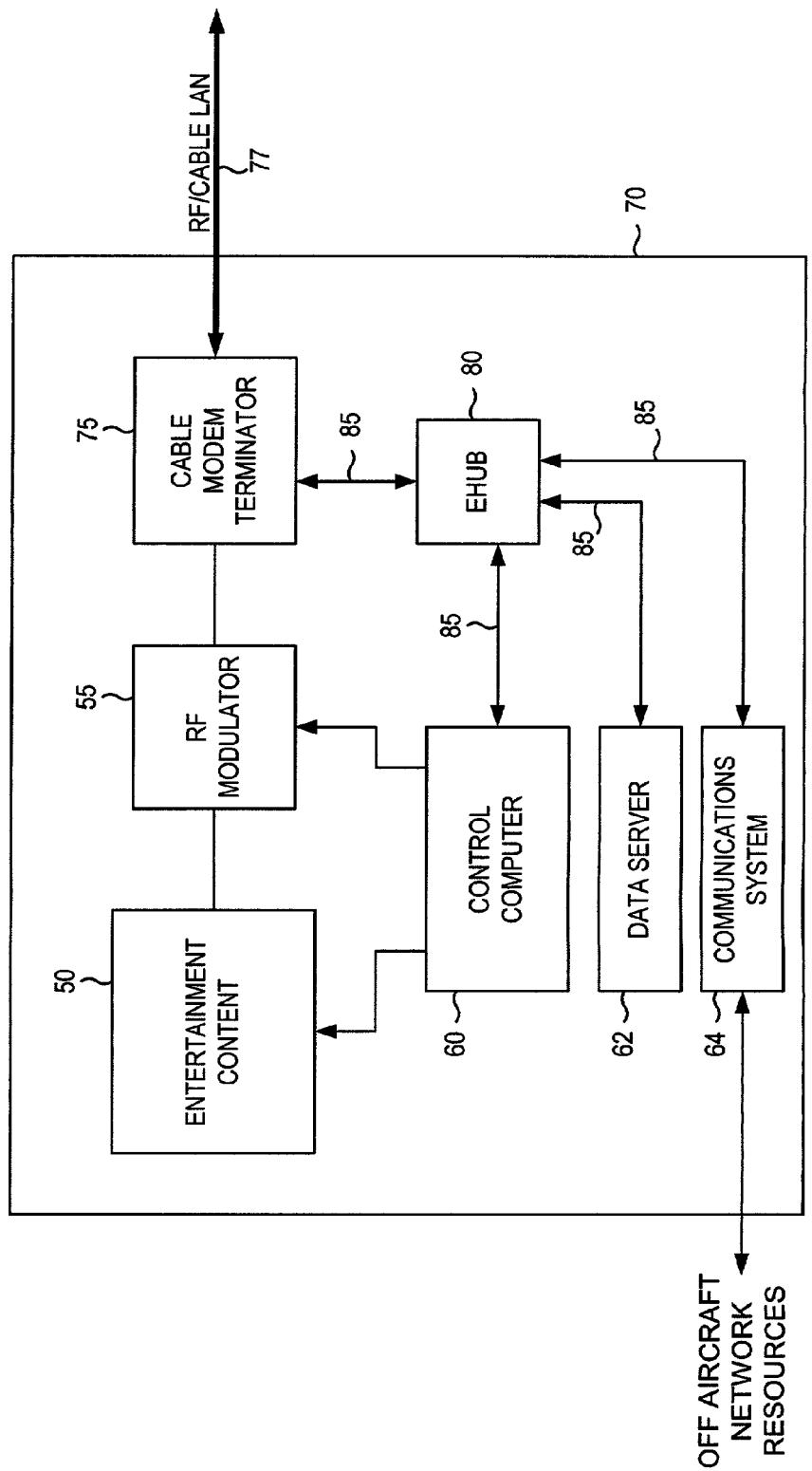
FIG. 3 is a block diagram of a new head-end according to one example embodiment of present invention.

FIG. 3 is a block diagram of a new head-end according to one example embodiment of present invention. In this example embodiment, the present head-end 70 comprises a cable modem terminator 75. The cable modem terminator 75 accepts digital data from a first digital network 85. The first digital network may be an Ethernet LAN. The cable modem terminator 75 converts the digital data it receives from the first digital network 85 into a data modulated carrier signal. This data modulated carrier signal may then be propagated throughout the aircraft using an RF/CABLE LAN 77. In some embodiments, the RF distribution system may comprise a hybrid configuration where RF signals are distributed through the aircraft using a combination of wire-based and fiber optic medium. In these embodiments, conversion units convert the RF signals from RF energy to modulated light as the medium changes.

The cable modem terminator 75 also accepts a modulated carrier from an RF modulator 55 that further comprises the present head-end 70. The present head-end 70 may further comprise an entertainment content server 50. The entertainment content server 50 typically creates one or more signals that carry entertainment content. These signals may be used to modulate one or more carriers. This modulation process occurs in the RF modulator 55. Entertainment modulated carrier signals pass through the cable modem terminator 75. The cable modem terminator 75 may introduce some signal loss as it combines the entertainment modulated carrier signals at some frequencies with data modulated carrier signals at other frequencies. The cable modem terminator 75 generates the data modulated signals based on digital data received from the first digital network 85.

In one example embodiment of the present invention, the cable modem terminator 75 may comprise a device that is compliant with the Data Over Cable Service Interface Specification (DOCSIS). The text of this interface specification, published by the CableLabs Coalition as DOCSIS 1.0, DOCSIS 1.1 and DOCSIS 2.0 are hereby incorporated into this disclosure by reference. It should be noted that the DOCSIS specification may evolve with time and that the present invention is not to be limited to existing versions of the specification. One key feature of the present invention is the use of this specification as a basis for combining the passenger LAN used in prior art systems with the RF cable distribution subsystem used to disseminate entertainment content in the prior art.

In some embodiments of the present invention, the new head-end 70 may further comprise a control computer 60. In these embodiments, the control computer 60 may be connected to a cable modem terminator 75 by means of a first digital network 85. In some variations of this embodiment, the present head-end 70 may further comprise an electronic network hub 80. The electronic network hub 80 may serve as an attachment point for one or more computing devices to attach to the first digital network 85.

In yet another embodiment of the present invention, the present head-end 70 may further comprise a data server 62. In these embodiments, the data server 62 may be connected to the cable modem terminator 75. The connection from the data server 62 to the cable modem terminator 75 may be accomplished by attaching the data server 62 to the first digital network 85. Such an attachment to the first digital network 85 may be accomplished by attaching the data server 62 to the electronic hub 80.

Operationally, the cable modem terminator 75 may receive data that emanates from either the control computer 60 or the data server 62. Once the data arrives at the cable modem terminator 75, it may be modulated onto a data-carrying carrier signal. This carrier signal may then be propagated throughout the passenger aircraft using the RF/CABLE LAN cable subsystem 77.

Figure 4:
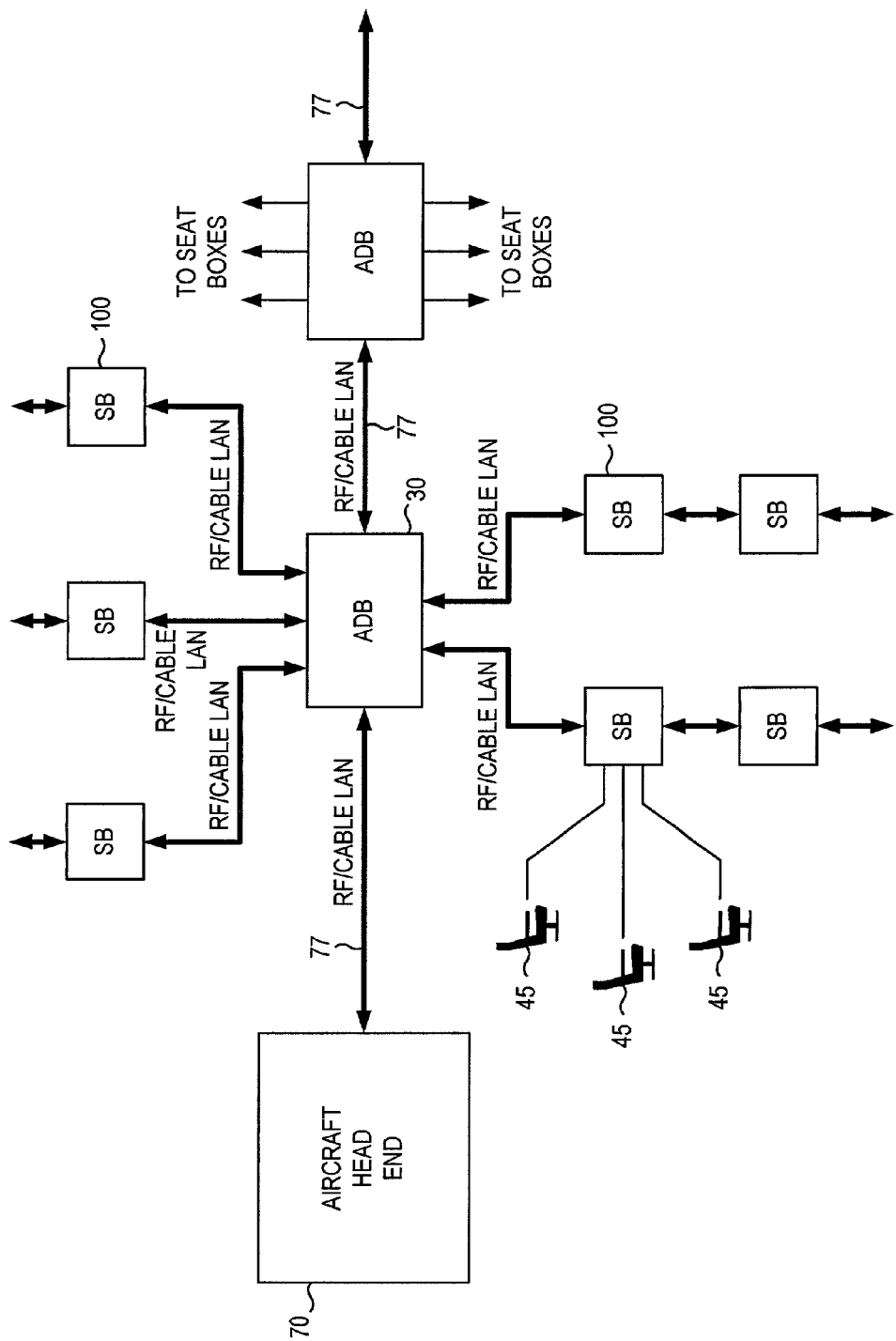
FIG. 4 is a block diagram that depicts a typical installation of an in-flight entertainment system according to the present invention.

FIG. 4 is a block diagram that depicts a typical installation of an in-flight entertainment system according to the present invention. In this illustrative embodiment, a new head-end 70 is installed in the aircraft. The new head-end 70 may be connected to a first ADB 40 by way of an RF/CABLE LAN 77 connection. The first ADB 40 typically propagates the RF/CABLE LAN connection 77 to subsequent ADBs in order to form a main trunk. Note that the passenger LAN 20 of prior art may no longer be required in an installation according to the present invention.

Each ADB 40 may service one or more seat boxes 100. The seat boxes utilized in this illustrative embodiment of the present invention are new compared to those used in prior art IFE systems. Each new seat box 100 may service one or more airline passengers 45. Each new seat box 100 receives a data modulated carrier signal from the RF/CABLE LAN 77. This data modulated carrier signal carries data received by the cable modem terminator 75 from the first digital network 85.

Figure 5:
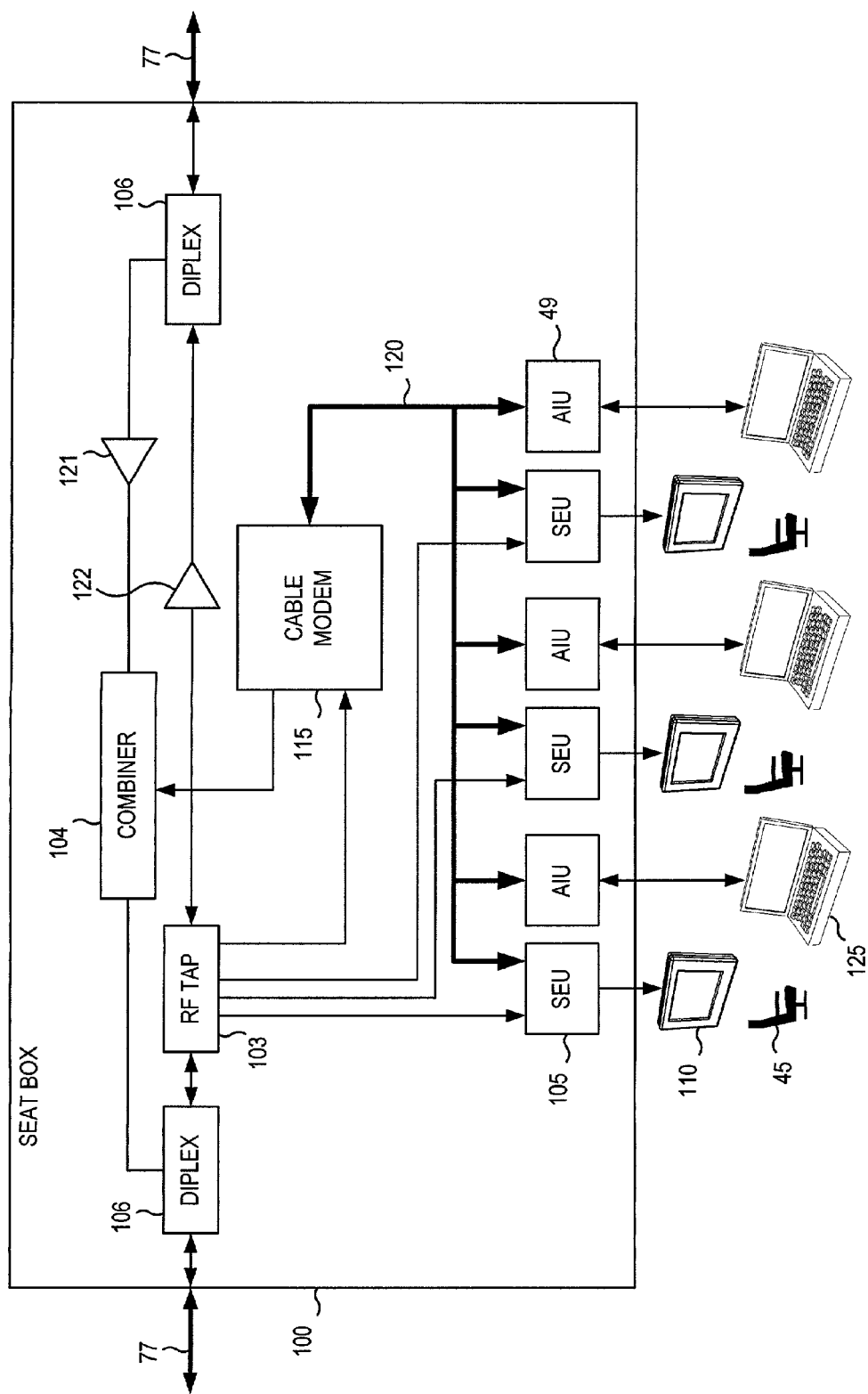
FIG. 5 is a block diagram that depicts the structure and application of an improved seat box according to one example embodiment of the present invention.

FIG. 5 is a block diagram that depicts the structure and application of an improved seat box according to one example embodiment of the present invention. Each present seat box 100 may comprise a cable modem 115. The cable modem 115 typically converts the data modulated carrier signal it receives from the RF/CABLE LAN 77 into data packets that may be conveyed to a secondary data network 120. According to one illustrative embodiment of the present invention, each seat box 100 forms a separate secondary digital network 120 so that any given in-flight entertainment system according to the present invention comprises one or more secondary digital networks. In yet another example of the present invention, the secondary digital network may be an Ethernet.

According to one illustrative embodiment of the present invention, the data modulated carrier signal propagated by the RF/CABLE LAN 77 is compliant with the DOCSIS specification introduced above. In such an embodiment, the cable modems 115 comprising each new seat box 100 comprise DOCSIS compliant devices.

Each airline passenger 45 may be provided with an aircraft integral display unit 110. The aircraft integral display unit 110 is typically driven by associated electronics, collectively called a seat electronic unit 105, necessary to capture entertainment content from entertainment modulated carrier signals disseminated by the present head-end 70. Each SEU 105 receives a portion of RF energy from the RF/CABLE LAN 77 by means of a RF signal tap 103. It should be noted that entertainment modulated carrier signals carry entertainment content sourced by the entertainment content server 50 and not data received by the cable modem terminator 75 from the first digital network 85.

According to the present invention each SEU 105 may be connected to the secondary digital network 120 formed by the present seat box 100. This allows an SEU 105 to receive digital data from any computing device attached to the first digital network 85 in the present head-end 70.

In some embodiments of the present invention, the entertainment content server 50 comprising the present head-end 70 may be capable of providing on-demand entertainment content. Typically, such a system will provide video-on-demand capability. In these embodiments, it is necessary to receive requests for entertainment from each passenger 45 on board the aircraft. In the prior art, these requests were received through the passenger LAN 20.

In the present invention, passenger requests are communicated from individual SEUs 105 to the secondary digital networks 120 that they are attached to. The request is carried by the secondary digital network 120 to the cable modem 115 comprising the new seat box 100. The cable modem 115 receives the request and creates a modulated request-carrying carrier signal. The modulated request-carrying carrier signal may then be propagated back to the cable modem terminator 75 using the RF/CABLE LAN 77. In such embodiments of the present invention, the cable modem terminator 75 receives the modulated request-carrying carrier signal and demodulates the signal to extract digital data. The extracted digital data may then be conveyed to the first digital network 85. Computing devices, such as the control computer 60, may then receive individual passenger requests for entertainment content from the first digital network 85. In one example embodiment, the control computer passes the passenger request it receives from the first digital network 85 to the entertainment content server 50 in order to effect the request for entertainment.

In some embodiments of the present invention, passengers may be provided with an attachment interface 49. The attachment interface 49 allows individual passengers to connect personal electronic devices 125 to the secondary digital network 120 formed by the seat box 100 of the present art. When a passenger 45 connects a personal electronic device 125 to the secondary digital network 120, that personal electronic device 125 is able to access data resident on an airborne data server 62. In some embodiments of a system according to the present invention, the attachment interface 49 may further comprise the seat box 100.

Passenger initiated data requests may be conveyed by the personal electronic device 125 to the secondary digital network 120. The cable modem 115 modulates a request-carrying carrier signal according to the request and conveys that carrier signal to the RF/CABLE LAN 77. The request-carrying carrier signal may then be propagated back to the cable modem terminator 75 located in the new head-end 70. When the carrier signal arrives at the cable modem terminator 75, it is demodulated so that the digital data comprising the original request can be extracted. The extracted digital data may then be conveyed to the first digital network 85 where the airborne server 62 can receive the request.

In some embodiments of the present invention, the electronic network hub 80 may further comprise a network address translation unit. The network address translation unit facilitates access to the first digital network 85 by passenger personal electronic devices attached to the secondary digital networks 120. The electronic hub 80 may need to alter the addresses of passenger initiated data requests so that they conform to the address scheme of the first digital network.

While an aircraft is in flight, passenger initiated requests for data may be routed to the airborne server 62 on a selective basis. The network address translation unit may further comprise a user registration unit. In this illustrative embodiment, the user registration unit accepts registration requests from passengers on the aircraft. The user registration unit may create routing directives that are used to selectively route network requests from passengers to either the airborne server or to a communications system 64. The communications system 64 may further comprise the new head-end 70 and may be connected to the first digital network 85. When a passenger registers for off-aircraft service, network requests from that passenger are routed to the communications system 64. The communications system 64 may propagate the network requests to terrestrial networks such as the Internet. Passengers who have not registered for off-aircraft service have their network requests routed to the airborne server. The network address translation unit may route network request by performing an address translation.

In yet another illustrative embodiment of the present invention, the cable modem terminator 75 may form a down-stream data path from the new head-end 70 to either aircraft integral passenger electronics or personal electronic devices belonging to individual passengers. In this same embodiment, each cable modem comprising a seat box completes the down-stream data path to these computing devices. The cable modems comprising each individual seat box may also form an up-stream data path from aircraft integral passenger electronics or personal electronic devices back to the new head-end 70 by way of the cable modem terminator 75. Hence, in this illustrative embodiment, a bi-directional data path is formed between the first digital network 85 comprising the new head-end 70 and secondary digital networks formed in each seat box. This bi-directional data path enables the application of network transfer protocols such as Transmission Control Protocol/Internet Protocol (TCP/IP). In some embodiments of the present invention, requests for network data are performed using TCP/IP.

In most embodiments of the present invention, entertainment content may be provided by the entertainment content server 50 comprising the new head-end 70. Entertainment content sourced by the entertainment content server 50 is used to create modulated carriers that convey the entertainment content to aircraft integral devices such as the SEU 105. In some embodiments, entertainment modulated carriers are received in a new seat box 100. The new seat box 100 may comprise an RF tap 103. The RF tap 103 siphons a portion of the carrier energy propagated by the RF/CABLE LAN 77 and directs it to the SEU 105. Although this method works well for delivering entertainment content to passengers using the aircraft integral devices, the entertainment modulated carriers are typically not compatible with network interfaces commonly used in passenger electronic devices attached to the secondary networks by individual passengers.

In order to enable the delivery of entertainment content to personal electronic devices attached to the secondary networks formed by each individual seat box, some embodiments of the present invention comprise a method for storing entertainment content on the airborne server 62 comprising the new head-end 70. In these types of system embodiments, entertainment content stored on the airborne server 62 may be directed to the first digital network 85 comprising the new head-end 70. This entertainment content may then be used by the cable modem terminator 75 as digital data representative of the entertainment content. The digital data may then be used to create data modulated carriers. The data modulated carriers may then be propagated to individual seat boxes using the RF/CABLE LAN 77.

Once these data modulated carriers arrive at the individual seat boxes, the digital data that they carry may be extracted by the cable modems comprising the individual seat boxes and conveyed to their associated secondary digital network. Once the data, representative of the entertainment content originally stored on the airborne server 62, is conveyed to a secondary digital network, personal electronic devices may then receive that data. The personal electronic devices may then present entertainment to individual passengers as digital data is received. In some embodiments of the present invention, aircraft integral devices attached to the secondary digital network may also receive entertainment content stored on the airborne server 62 in this same manner.

Some embodiments of a new IFE system may utilize area distribution boxes of prior art. In these embodiments, the area distribution boxes typically do not provide any means for amplifying RF signals propagated from the new head-end 70 to individual passengers in the aircraft. The distribution of either entertainment modulated or data modulated carriers may be accomplished by splitting the RF signals to form a distribution tree. A typical RF tap is also capable of combining the upstream request-carrying carrier signals generated by the cable modem 115. This mean that no additional capability need to be disposed in either the seat box or the area distribution box to support an RF back channel.

Figure 6:
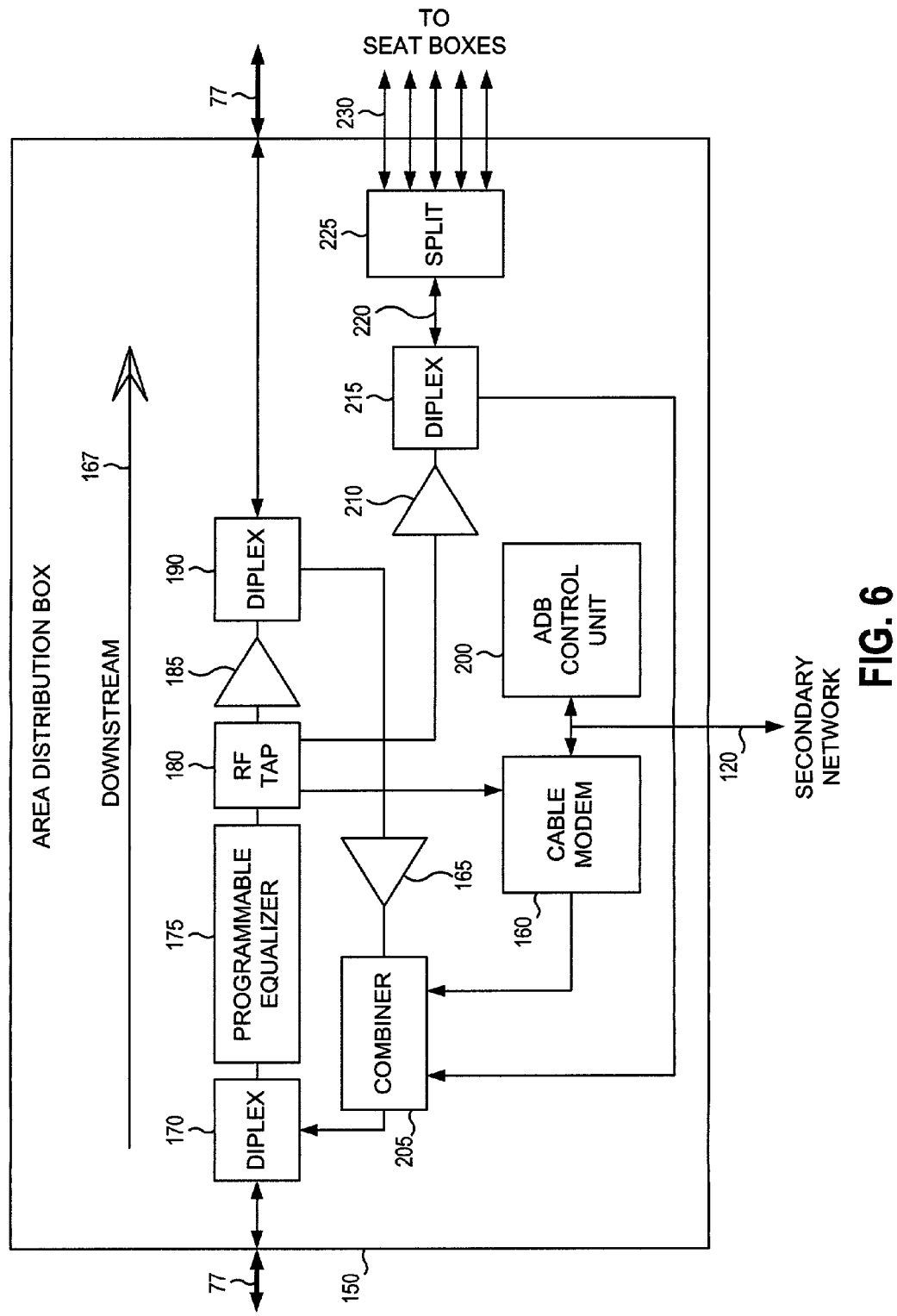
FIG. 6 is a block diagram of one illustrative embodiment of a new area distribution box according to the present invention.

FIG. 6 is a block diagram of one illustrative embodiment of a new area distribution box according to the present invention. In one illustrative embodiment of a system according to the present invention, the area distribution boxes may comprise amplification capability in order to boost the signal level of RF carriers throughout the distribution subsystem. In such embodiments, a new area distribution box 150 may be required. In order to support an RF back channel, the new area distribution box 150 typically supports a downstream signal path 167. The downstream signal path 167 propagates entertainment and data modulated carriers emanating from the new head-end 70 to individual passengers on the aircraft.

According to one illustrative embodiment, the downstream signal path 167 is established through the use of a first diplex filter 170 and a second diplex filter 190. The RF carriers entering the area distribution box 150 through the RF/CABLE LAN 77 are allowed into the downstream signal path 167. In some embodiments, the area distribution box 150 may further comprise a programmable equalizer 175. RF carriers may first encounter the programmable equalizer 175 after they pass the first diplex filter 170. The programmable equalizer 175 may selectively attenuate lower frequency carrier signals so that the signal level of lower frequency carrier signals may approximate the signal level of higher frequency carrier signals that may have been attenuated through the RF distribution medium comprising the RF/CABLE LAN 77.

The downstream signal path 167 may be completed by a first RF amplifier 185 and the second diplex filter 190. An RF back channel may be formed when request-carrying carrier signals are directed by the second diplex filter 190 to a second RF amplifier 165. The second RF amplifier may be omitted in some embodiments of the present invention.

In a typical embodiment of the present invention, the area distribution box 150 may further comprise an RF tap 180. The RF tap 180 may split the downstream signal path 167 between a cable modem 160 and a seat box distribution subsystem, both of which may further comprise the ADB. The remaining energy may be propagated to downstream ADBs. Some portion of the RF energy may comprise a data modulated carrier signal. This may be presented to the cable modem 160 comprising the new area distribution box 150. The cable modem 160 typically converts data from data modulated carrier signals into a second digital network 120.

In one illustrative embodiment, the area distribution box 150 may further comprise an ADB control unit 200. The ADB control unit 200 may be attached to the secondary digital network 120. The ADB control unit 200 may receive commands by means of the secondary digital network 120. The ADB control unit 200 may respond to commands that it receives in order to control the programmable equalizer 175. In some embodiments, one or more of the RF amplifiers comprising the ADB may be programmable amplifiers. These, too, may be controlled by commands sent to the ADB control unit 200. It should be noted that ADB control unit 200 may respond to a wide variety of commands and that the scope of the present invention is not intended to be limited by the type of commands that the ADB control unit 200 may execute. In some embodiments, the secondary digital network 120 may be routed external to the ADB 150 so that external devices may be attached to it.

Some portion of the RF energy tapped from the downstream signal path 167 by the RF tap 180 may be directed to one or more seat box interfaces 230. The new area distribution box 150 may further comprise a signal splitter 225 that divides RF energy tapped from the downstream signal path 167 among one or more of these seat box interfaces 230. In some embodiments, the signal level of the RF energy may be first amplified by a third amplifier 210 comprising the ADB 150. In these embodiments, the ADB 150 further comprises a third diplex filter 215. The third diplex filter 215 allows data and/or entertainment modulated carriers flowing through the downstream signal path 167 to propagate outward to the seat box interface 230.

In some embodiments of a new ADB 150, a back channel may be formed for request-carrying carrier signals generated by cable modems disposed in seat boxes. In these embodiments, seat box generated request-carrying carrier signals enter the new ADB 150 through one or more of the seat box interfaces 230. The signal splitter 225 acts to combine carriers from a plurality of seat box interfaces 230. The request-carrying carrier signals may then be directed by the third diplex filter 215 to a back channel signal combiner 205 that may further comprise the ADB.

The back channel signal combiner 205 may receive request-carrying carrier signals from the cable modem 160 comprising the ADB 150 and from the second diplex filter 190 that propagates back channel signals from down-stream area distribution boxes. The combined back channel may then be directed to the first diplex filter 170 in order to propagate request-carrying carrier signals from either the seat box interface 230, the cable modem 160 comprising the ADB or downstream ADBs back to the new head-end 70 through the RF/CABLE LAN 77.

Referring briefly to FIG. 5, a block diagram depicting the internal structure of a seat box 100, some system embodiments may dispose amplifiers in the seat boxes. New seat boxes according to the present invention may comprise a first amplifier 121 for boosting the RF signal level of entertainment and/or data modulated carriers. In some embodiments, a new seat box may further comprise a second amplifier 122 for boosting the RF level of request-carrying carrier signals traveling through a back channel.

Much akin to the structure of the new ADB, a new seat box 100 may further comprise two diplex filters 106 that provide for a downstream path and a back channel. In such embodiments, a local cable modem 115 comprising the new seat box may direct request-carrying carrier signals to a back channel signal combiner 104 that combines request-carrying carrier signals from downstream seat boxes with the local signal.

In all embodiments of either a new ADB or new seat box that comprise amplification capability, the diplex filters segregate the down stream signal path from a back channel. The diplex filters typically segregate signals flowing downstream from signals flowing in the back channel according to frequency. In most embodiments of a system according to the present invention, the request-carrying carrier signals may be fixed below 100 MHz. Downstream signals that comprise entertainment and/or digital data modulated carrier signals may be at frequencies greater that 100 MHz. Hence, in these embodiments, the diplex filters would be set at 100 MHz. In should be noted that the 100 MHz cut-off frequency is defined here merely for illustrative purposes only and that the invention presented here may embody other cut-off frequencies.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

I claim:

1. A passenger in-flight entertainment system comprising:
airborne server that sources data;
first digital network that receives data from the airborne server;
cable modem terminator that accepts data from the server by way of the first digital network and modulates a carrier signal according to the data;
radio frequency distribution subsystem that propagates the carrier signal throughout an aircraft;

cable modem that accepts a carrier signal from the radio frequency distribution system and extracts digital data therefrom;

secondary digital network that accepts digital data from the cable modem that was extracted from the carrier signal by said cable modem, and a network address translator that accepts network requests from the cable modem terminator and conforms said request to the address scheme of the first digital network, the network address translator comprising:

user registration unit that accepts registration requests from passenger personal electronic devices and maintains a list of personal electronic devices that have registered for off-aircraft services and creates routine directives for each network request received from the cable modem terminator; and address translation unit that accepts routing directives from the user registration unit and translates the address of network requests in order to direct the request to the airborne server if the routing directive indicates that the personal electronic device sourcing the network request has not registered for off-aircraft services and direct the network request to a communications unit if the routing directive indicates that the personal electronic device sourcing the network request has registered for off-aircraft services.

2. The passenger in-flight entertainment system of claim 1 further comprising:

passenger personal electronic device attachment interface that accepts digital data from the secondary digital network and propagates the digital data to personal electronic devices connected thereto.

3. The passenger in-flight entertainment system of claim 2 wherein the cable modem accepts a network request from a personal electronic device attached to the personal electronic device attachment interface and modulates a request-carrying carrier signal according to the network request and wherein the radio frequency distribution subsystem propagates the request-carrying carrier signal back to the cable modem terminator and wherein the cable modem terminator extracts network requests from the request-carrying carrier signal.

4. The passenger in-flight entertainment system of claim 1 wherein:

entertainment content is stored in the airborne data server and is directed to the first digital network and wherein the entertainment content is received in aircraft integral devices or personal electronic devices attached to one of the secondary digital networks.

5. The passenger in-flight entertainment system of claim 1 wherein the cable modem terminator comprises a DOCSIS complaint device.

6. The passenger in-flight entertainment system of claim 5 wherein the first digital network is an Ethernet.

7. The passenger in-flight entertainment system of claim 1 wherein the modulated carrier signal is a DOCSIS compliant signal and the cable modem is a DOCSIS compliant device.

8. The passenger in-flight entertainment system of claim 7 wherein the secondary digital network is an Ethernet.

* * * * *